United States Patent [19]

Usui et al.

[11] Patent Number: 5,026,611
[45] Date of Patent: * Jun. 25, 1991

[54] METAL-MADE CARRIER BODY FOR EXHAUST GAS CLEANING CATALYST AND PRODUCTION OF THE CARRIER BODY

[75] Inventors: Masayoshi Usui; Haruo Serizawa, both of Shizuoka, Japan

[73] Assignee: Usui Kokusai Kangyo Kabushiki Kaisha, Japan

[ * ] Notice: The portion of the term of this patent subsequent to Aug. 14, 2007 has been disclaimed.

[21] Appl. No.: 376,056

[22] Filed: Jul. 6, 1989

[30] Foreign Application Priority Data

Jul. 6, 1988 [JP] Japan .................. 63-166835
Aug. 13, 1988 [JP] Japan .................. 63-201033

[51] Int. Cl.⁵ .......................... B01J 25/04; F01N 3/28
[52] U.S. Cl. .......................... 428/593; 428/600; 428/603; 502/439; 502/527; 228/258
[58] Field of Search .............. 428/593, 682, 683, 685, 428/600, 603; 228/181, 258; 502/527, 439; 422/180

[56] References Cited

U.S. PATENT DOCUMENTS

| | | | |
|---|---|---|---|
| 2,375,661 | 5/1945 | Karmazin | 228/258 |
| 4,477,012 | 10/1984 | Holland et al. | 228/258 |
| 4,576,800 | 3/1986 | Retallick | 502/439 |
| 4,777,158 | 10/1988 | Cyron | 502/439 |
| 4,847,966 | 7/1989 | Kuchelmeister | 502/439 |
| 4,948,774 | 8/1990 | Usui et al. | 502/439 |

FOREIGN PATENT DOCUMENTS

| | | | |
|---|---|---|---|
| 3543011A1 | 6/1987 | Fed. Rep. of Germany | 502/439 |
| 3726502A1 | 3/1988 | Fed. Rep. of Germany | 502/439 |
| 54-13462 | 1/1979 | Japan . | |
| 59-101243 | 6/1984 | Japan | 228/181 |
| 59-101244 | 6/1984 | Japan | 228/181 |
| 57-1585 | 1/1985 | Japan . | |
| 61-199574 | 9/1986 | Japan . | |

*Primary Examiner*—John J. Zimmerman
*Attorney, Agent, or Firm*—Lowe, Price, LeBlanc & Becker

[57] ABSTRACT

A metal-made carrier body, for carrying thereon an exhaust gas cleaning catalyst, comprises a metal casing, and a multi-layered composite structure or honeycomb core structure composed of a sheet-like metal band and a corrugated metal band and enclosed in the tubular metal casing and joined therewith. The inner wall of the casing is provided with fine recesses for promoting the penetration of a brazing material. Because of the fine recesses, it is possible to join the honeycomb core structure and the casing together with adequate firmness, thus making the carrier body excellently durable.

16 Claims, 4 Drawing Sheets

METAL-MADE CARRIER BODY FOR EXHAUST GAS CLEANING CATALYST AND PRODUCTION OF THE CARRIER BODY

BACKGROUND OF THE INVENTION

1. Field of the Invention

The present invention relates to a metal-made carrier body for carrying thereon an exhaust gas cleaning catalyst which is generally provided as an exhaust gas cleaning means at an intermediate point of an exhaust system of an automobile.

More particularly, the invention relates to a metal-made carrier body for carrying thereon an exhaust gas cleaning catalyst, in which the individual components of the carrier body are joined with improved strength so as to resist against peeling due to thermal strains. The invention is also concerned with a method of manufacturing such metal-made carrier body.

2. Description of the Related Art

Conventional metal-made carrier bodies of the above sort, which are adapted to carry an exhaust gas cleaning catalyst thereon, include those having a structure formed by laminating at least one sheet like metal band and at least one corrugated metal band in layers or rolling them together into a multi-layered composite body with a view toward increasing the carrying area per unit volume, namely, with a view toward increasing as much as possible the effective area of contact between exhaust gas and the exhaust gas cleaning catalyst per unit volume and further reducing the weight of the metal-made carrier body to a maximum possible extent. As it is in the form of a honeycomb, this structure is hereinafter called "honeycomb core structure".

For example, a sheet-like metal band made of a heat-resistant thin metal sheet having a thickness of 0.1 mm or smaller and a corrugated band made from another thin metal sheet of the same type are superposed one over the other to have areas of contact therebetween. They are then rolled together spirally into a honeycomb core structure defining many network-patterned gas flow passages along a central axis thereof for allowing exhaust gas to pass therethrough. The honeycomb core structure is enclosed within a tubular metal casing which has a single-layer structure and opens in opposite ends thereof. The members of the honeycomb core structure, i.e., the sheet-like band and corrugated band are put together into a vibration-proof structure. Namely, the sheet like band and corrugated band as well as the honeycomb core structure thus rolled and the metal casing are joined together at the areas of contact therebetween by welding, brazing or the like. These joining means at the areas of contact between the honeycomb core structure and the metal casing are exemplified by the following:

(i) Electron beam welding, laser beam welding, arc welding, etc. as disclosed in Japanese Patent Laid-Open Publication No. 13462/1979 and Japanese Patent Laid-Open Publication No. 1585/1982, for example.

(ii) Brazing, as disclosed in Japanese patent Laid-Open Publication No. 199574/1986. This brazing includes enclosing a honeycomb core structure in a metal casing, applying a brazing material over end portions of such a composite structure such as by painting or spraying, and heating around end portions of the composite structure.

The above conventional joining methods cause the following production and quality problems:

With the joining method of (i) above, it is necessary to use special and expensive equipments.

In the joining method of (ii) above, the applying of wax is laborious and time-consuming, and the degree of joining strength at the central portion of the areas of contact between the honeycomb core structure and the metal casing is not adequate.

Generally, the metal-made carrier body of this type is used in severe thermal environments and hence requires adequate durability against any breakage, cracking or peeling of the members making up the carrier body. In the exhaust system of an automobile, the members of the carrier body are subjected to strains (hereinafter called "thermal strains") due to the large difference between their coefficients of thermal expansion (volume expansion and linear expansion) under the severe cooling and heating cycle of from $-20°$ C. to $900°$ C. These members are also subjected to vibrations from the automobile body. As a result, the members would be separated, cracked or otherwise damaged.

If different kinds of metal materials, i.e., austenitic stainless steel and ferritic stainless steel are used for the metal casing and the honeycomb core structure, respectively, in view of oxidation resistivity and thermal stability, the extent of separation of these two parts would be much greater because of the difference in thermal expansion between the two parts. If a small scale separation occurs at the areas of contact between the metal casing and the honeycomb core structure, such small separation would expand in relays. Concurrently with this separation, vibration from the automobile body is applied to these two parts so that especially the contact portions between a sheet-like band and a corrugated band constituting the honeycomb core structure are subjected to peeling, cracking, breakage or other damage.

Consequently, in the metal-made carrier body of this conventional type, the inner wall surface of the metal casing and the outer peripheral surface of the honeycomb core structure must be joined to each other reliably with adequate firmness. Heretofore, there has been proposed no effective joining method.

SUMMARY OF THE INVENTION

It is therefore an object of the present invention to provide a metal-made carrier body for carrying an exhaust gas cleaning catalyst thereon, which can prevent separation of the constituent members of the carrier body from each other and cracking of the constituent members themselves, thus guaranteeing an adequate cleaning function for a long period of time.

According to a first aspect of the present invention, there is provided a metal-made carrier body for carrying thereon an exhaust gas cleaning catalyst, the carrier body being formed by superposing a sheet like metal band made of a thin metal sheet and a corrugated band made from another thin metal sheet one over the other in a contiguous relation into a honeycomb core structure of a spiral or laminate form defining many network-patterned gas flow passages along the central axis thereof, and then fixing the honeycomb core structure within a tubular metal casing, characterized in that the tubular metal casing defines, in an inner wall thereof, fine recesses for promoting the penetration of a molten brazing material.

According to a second aspect of the invention, there is provided a method of manufacturing a metal-made carrier body for carrying thereon an exhaust gas cleaning catalyst, including superposing a sheet-like metal band made of a thin metal sheet and a corrugated band made from another thin metal sheet one over the other in a contiguous relation into a honeycomb core structure of a spiral or laminate form defining many network patterned gas flow passages along the central axis thereof, and then inserting the honeycomb core structure within a tubular metal casing and fixing the former on the latter, characterized in that:

(i) a tubular metal casing defining, in an inner wall thereof, fine recesses for promoting the penetration of a molten brazing material is used as the tubular metal casing, and the honeycomb core structure is forcedly inserted into the metal casing with or without a brazing material filled in the fine recesses; and (ii) the metal casing with the honeycomb core structure inserted therein is thereafter subjected to a heat treatment at a temperature of at least the melting point of the brazing material without applying the brazing material or after applying the brazing material to marginal portions near open ends of the metal casing.

The above and other advantages, features and additional objects of the present invention will become manifest to those versed in the art upon reference to the detailed description and the accompanying drawings in which various embodiments incorporating the principles of the present invention are shown by way of illustrative example.

DETAILED DESCRIPTION

As described above, the primary feature of the present invention resides in improving the joining strength between constituent members of a metal-made carrier body, especially the joining strength at the entire area of contact between the inner wall of a tubular metal casing and the peripheral surface of a honeycomb core structure.

A more specific feature of the present invention resides in providing an adequate degree of joining strength at and around the central portion of the inner wall of the tubular metal casing with the peripheral surface of the honeycomb core structure.

A variety of means for improving the joining strength between the honeycomb core structure and the tubular metal casing will now be described with reference to the accompanying drawings. However, the present invention is not limited to the illustrated embodiments.

Figure 1:
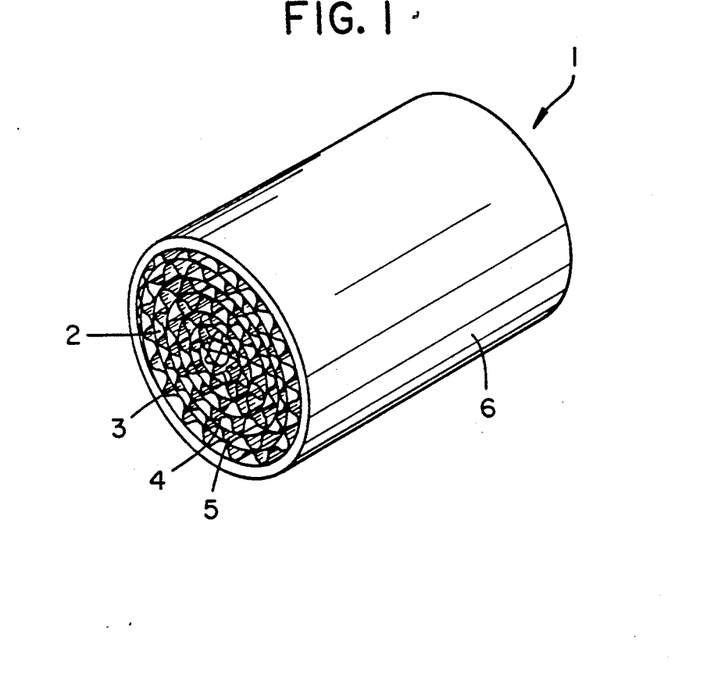
FIG. 1 is a perspective view of a rolled metal-made carrier body, for carrying thereon an exhaust gas cleaning catalyst, embodying the present invention.
Figure 2:
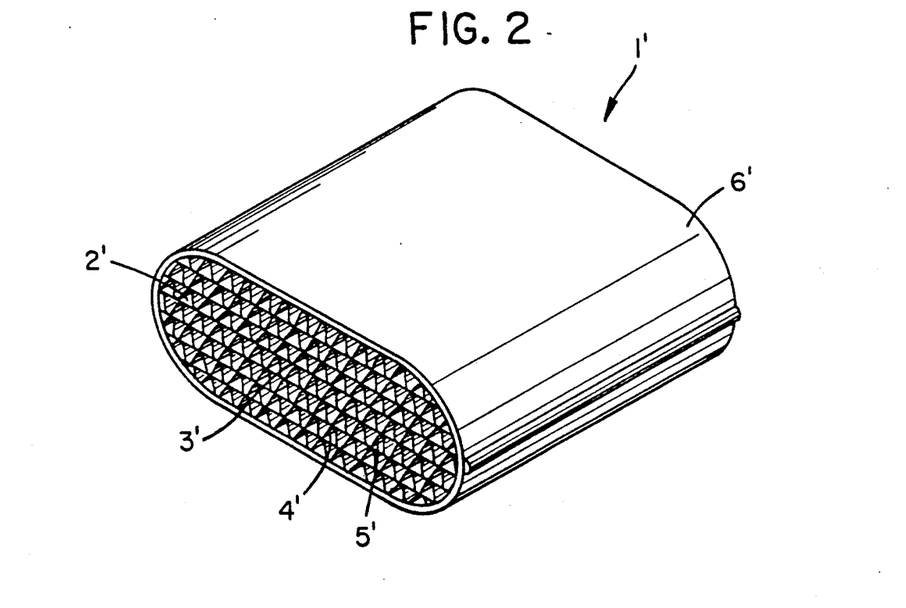
FIG. 2 is a perspective view of a laminated metal-made carrier body according to another embodiment of the invention.

FIGS. 1 and 2 are perspective views of a metal-made carrier body 1, 1', according to the present invention, for carrying thereon an exhaust gas cleaning catalyst. The metal-made carrier body 1, 1' is constructed in the following manner. A honeycomb core structure 2 of FIG. 1 is composed of a sheet-like metal band 3 and a corrugated metal band 4 rolled together into a spiral form. A honeycomb core structure 2' of FIG. 2 is composed of a sheet-like metal band 3' and a corrugated metal band 4' are are superposed one over the other. Then the honeycomb core structure 2, 2', as shown in FIGS. 1 and 2, is enclosed in a tubular metal casing 6, 6', and these constituent members are joined together in a manner described to provide the metal-made carrier body 1, 1' in a multi-layered composite form defining many network-patterned gas flow passages 5, 5' along the central axis of the carrier body 1, 1'.

In order to improve the joining strength between the honeycomb core structure 2, 2' and the tubular metal casing 6, 6', fine recesses 7 are formed on the entire inner wall of the tubular metal casing 6, 6', or on the central portion (excluding marginal portions contiguous to opposite open ends) of the casing 6, 6'. The fine recesses 7 serve to promote the penetration of a molten brazing metal.

The fine recesses 7 may be formed on the inner wall of the tubular metal casing 6, 6' in a variety of patterns shown in FIGS. 3 through 16. Further, the fine recesses 7 may be formed in straight lines, curved lines or dots (like a pear skin), or in combination thereof, such as by rolling, grinding, pressing (stamping) or honing. The term "curved lines" means "meandrine lines".

The individual recess 7 has a width of 0.03 to 0.3 mm and a depth of 0.03 to 0.3 mm, for example, which are sufficient to achieve an improved degree of joining strength. The size of the recess 7 is not limited to these particular figures.

In the present invention, the fine recesses 7 are formed in the following manner.

i) The fine recesses 7 may be formed on the inner wall of the casing 6 over its entire area in a variety of patterns shown in FIGS. 3 through 10.

Figure 3:
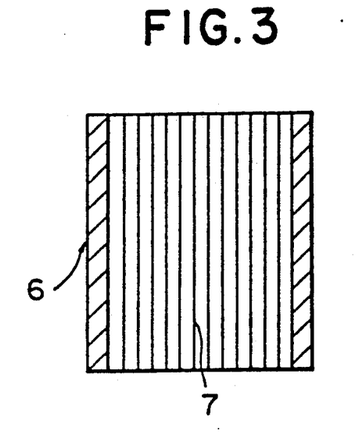
FIG. 3 is a longitudinal cross-sectional view of a metal casing in which fine recesses are formed in straight lines parallel to the central axis of the casing according to a first manner of the invention.

FIG. 3 is a longitudinal cross-sectional view of a cylindrical metal casing 6 in which the fine recesses 7 are formed on the inner wall along its entire length between the opposite open ends of the casing 6 in straight lines parallel to the central axis of the casing 6 and spaced at desired intervals.

Figure 4:
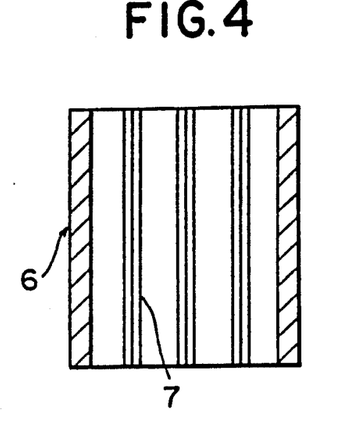
FIG. 4 is a longitudinal cross-sectional view of a metal casing in which fine recesses are formed in straight lines according to a second manner of the invention.

The fine recesses 7 of FIG. 4 are a modification of those of FIG. 3. The fine recesses 7 of FIG. 4 also are formed in straight lines parallel to the central axis of the casing 6.

Figure 5:
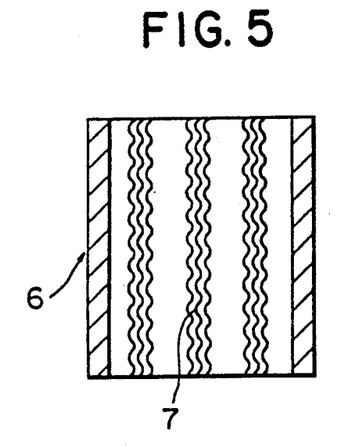
FIG. 5 is a longitudinal cross-sectional view of a metal casing in which fine recesses are formed in meandrine lines according to a third manner of the invention.

The fine recesses 7 of FIG. 5 are a modification of those of FIG. 4. The fine recesses 7 of FIG. 5, unlike the recesses of FIG. 4, are formed in curved lines (meandrine lines).

Figure 6:
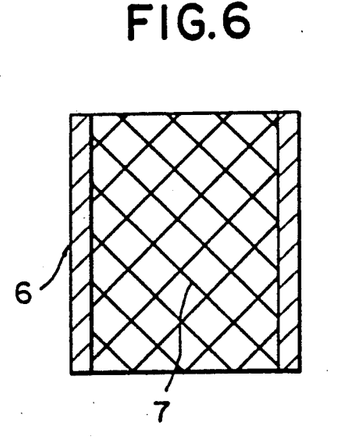
FIG. 6 is a longitudinal cross-sectional view of a metal casing in which fine recesses are formed in intersecting straight lines according to a fourth manner of the invention.

The fine recesses 7 of FIG. 6 are formed in intersecting straight lines extending at a desired anole with respect to the central axis of the tubular metal casing 6 and spaced at desired intervals.

Figure 7:
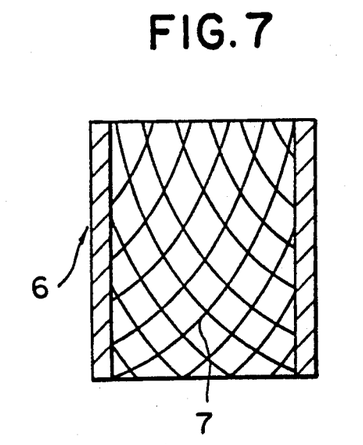
FIG. 7 is a longitudinal cross-sectional view of a metal casing in which fine recesses are formed in intersecting curved lines according to a fifth manner of the invention.

The fine recesses 7 of FIG. 7 are a modification of those of FIG. 6. The fine recesses 7 of FIG. 7, unlike the straight recesses of FIG. 6, are formed in curved lines.

Figure 8:
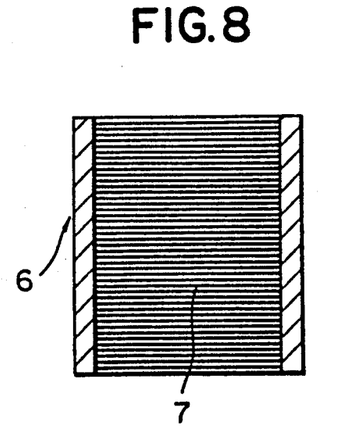
FIG. 8 is a longitudinal cross-sectional view of a metal casing in which fine recesses are formed in straight lines perpendicular to the central axis of the casing according to a sixth manner of the invention.
Figure 9:
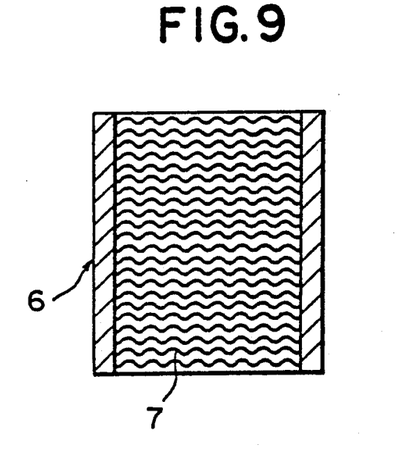
FIG. 9 is a longitudinal cross-sectional view of a metal casing in which fine recesses are formed in meandrine lines perpendicular to the central axis of the casing according to a seventh manner of the invention.

The fine recesses 7 of FIGS. 8 and 9 are formed in straight or curbed (meandrine) lines perpendicular to the central axis of the casing 6 and spaced at desired intervals.

Figure 10:
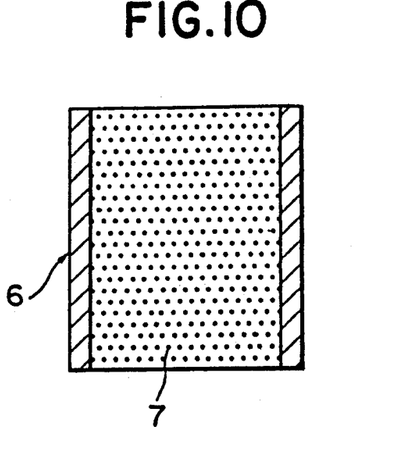
FIG. 10 is a longitudinal cross-sectional view of a metal casing in which fine recesses are formed in dots according to an eighth manner of the invention.

The fine recesses 7 of FIG. 10 are formed in dots like a pear skin) on the entire inner wall of the tubular metal casing 6.

ii) The fine recesses 7 may be formed on the inner wall of the tubular metal casing 6 at a central portion thereof in a variety of manners shown in FIGS. 11 through 16.

Figure 11:
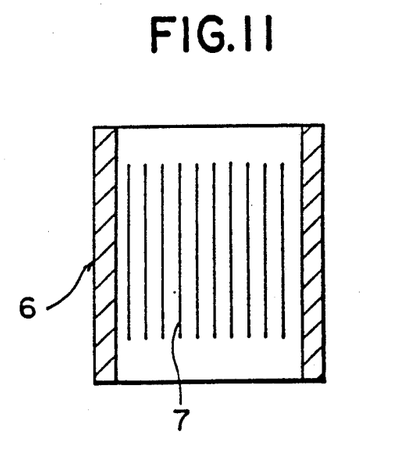
FIG. 11 is a longitudinal cross sectional view of a metal casing in which fine recesses are formed according to a ninth manner of the invention.

FIG. 11 is a longitudinal cross-sectional view of a tubular metal casing 6 in which the fine recesses 7 are formed on the inner wall of the casing 6 only at its central portion excluding marginal portions contiguous to opposite open ends of the casing 6, the fine recesses 7 being in straight lines parallel to the central axis of the casing 6 and spaced at desired intervals.

Figure 12:
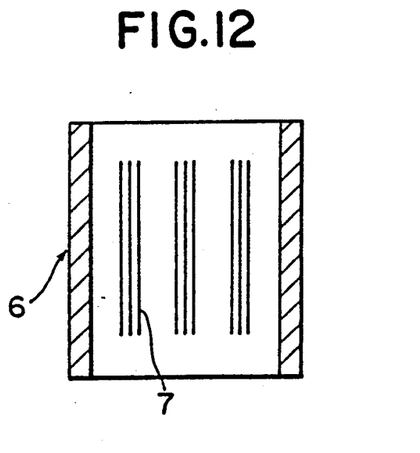
FIG. 12 is a longitudinal cross-sectional view of a metal casing in which fine recesses are formed according to a tenth manner of the invention

The fine recesses 7 of FIG. 12 are a modification of those of FIG. 11. The fine recesses 7 of FIG. 12 also are formed in straight lines parallel to the central axis of the tubular metal casing 6.

Figure 13:
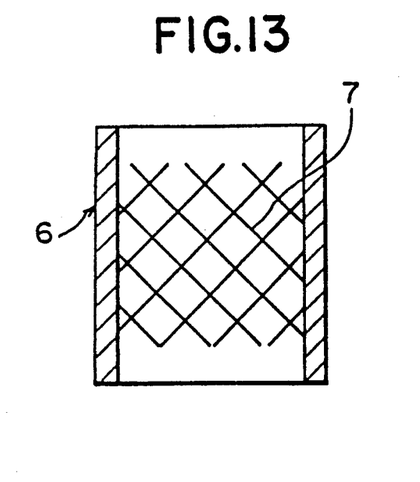
FIG. 13 is a longitudinal cross-sectional view of a metal casing in which fine recesses are formed according to a eleventh manner of the invention.

The fine recesses 7 of FIG. 13 are formed in intersecting straight lines extending at a desired angle to the central axis of the casing 6 and spaced a desired intervals.

Figure 14:
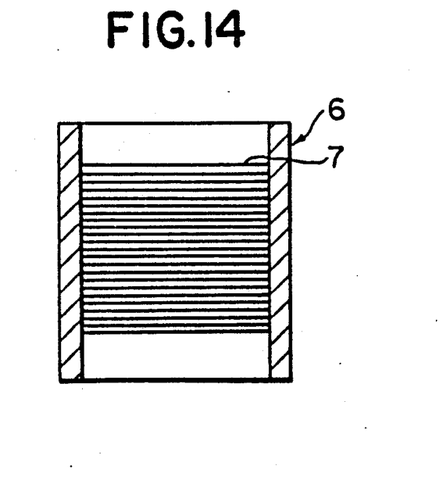
FIG. 14 is a longitudinal cross-sectional view of a metal casing in which fine recesses are formed according to twelfth manner of the invention.
Figure 15:
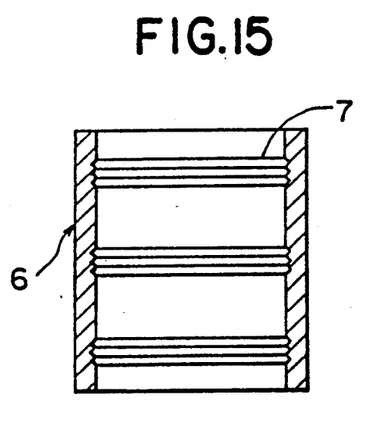
FIG. 15 is a longitudinal cross-sectional view of a metal casing in which fine recesses are formed according to a thirteenth manner of the invention.

The fine recesses of FIGS. 14 and 15 are formed in straight lines perpendicular to the central axis of the casing 6 and spaced at desired intervals.

Figure 16:
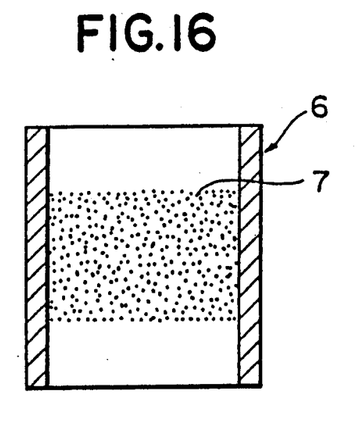
FIG. 16 is a longitudinal cross-sectional view of a metal casing in which fine recesses are formed according to a fourteenth manner of the invention.

The fine recesses of FIG. 16 are formed in dots (like a pear skin).

The present invention is not limited to the above illustrated examples. For example, the fine recesses 7 may be formed in any combination of straight lines, curved (meandrine) lines and dots (like a pear skin) by a suitable method.

In the present invention, the fine recesses 7 formed on the inner wall of the tubular metal casing 6 serve to assist in dispersing a molten brazing material uniformly over the outermost peripheral surface of the honeycomb core structure 2 by capillarity until the brazing material reaches the central portion of the inner wall of the casing 6. The brazing material may be filled in the fine recesses 7 before starting the brazing operation. Otherwise, the brazing material may be applied to the opposite open ends of the tubular metal casing 6 at the areas of contact between the casing 6 and the honeycomb core structure 2 when brazing; the molten brazing material may penetrate from the areas of contact between the two members toward the central portion.

As a result, the inner wall of the cylindrical metal casing 6 and the outer peripheral surface of the honeycomb core structure 2 are joined together reliably with adequate firmness. The brazing material to be used in the present invention is preferably a high-temperature brazing material such as Ni in view of the conditions of use of this kind of metal-made carrier body.

In the manufacture of the metal-made carrier body for carrying thereon an exhaust gas cleaning catalyst, as described above, the honeycomb core structure 2 is forcedly enclosed in the tubular metal casing 6 to provide a multi-layered composite body, with or without filling a brazing material in the fine recesses 7 formed in the inner wall of the metal casing 6. Then, with or without applying a brazing material over the marginal portions contiguous to the opposite open ends of the metal casing 6 such as by painting or spraying, the composite body is heated at a temperature higher than the melting point of the brazing material. The molten brazing material penetrates uniformly the entire areas of contact between the metal casing 6 and the honeycomb core structure 2 by capillarity of the fine recesses 7, thereby joining these two members reliably.

In the present invention, the sheet-like metal band 3, 3' and the corrugated metal band 4, 4', which constitute the honeycomb core structure 2, are joined together at the contact portions (the sheet-like band is in contact with the ridges or valleys of the corrugated band) by a known means.

In the present invention, if the brazing material is applied to the opposite open ends of the tubular metal casing 6 after the honeycomb core structure 2 is enclosed in the casing 6, the contact portions between the sheet-like metal band and the corrugated metal band can be joined concurrently with the joining between the peripheral surface of the honeycomb core structure 7 and the metal casing 6, thus causing an improved rate of production. In this case, it is preferred to use the tubular metal casing 6 in which the fine recesses 7 are formed on the inner wall of the tubular metal casing 6 at portions except the marginal portions contiguous to the opposite open ends of the casing 6.

With the metal-made carrier body constructed as mentioned above, since fine recesses are formed on the inner wall of of the tubular metal casing along the entire wall surface or only at the central portion thereof, it is possible to achieve the following advantageous results:

i) The inner wall of the metal casing and the peripheral surface of the honeycomb core structure can be joined together at their areas of contact with adequate firmness, thus making the metal-made carrier body excellently durable.

ii) Since the molten brazing material penetrates uniformly over the entire peripheral surface of the honeycomb core structure by capillarity of the fine recesses, it is possible to improve the joining strength remarkably.

iii) It is possible to control the amount of use of a brazing material; in general, an expensive high-temperature brazing material such as Ni is used for production of a metal-made carrier body.

The present invention will now be described in detail by the following examples. It should be noted that the present invention is not limited to these illustrated examples.

EXAMPLE 1

(i) production of honeycomb core structure

A heat-resistant thin steel band made of ferritic stainless steel (Cr content: 20%, Al content: 5%) and having a thickness of 0.04 mm and a width of 74.5 mm was used as a sheet-like metal band.

The sheet-like metal band was fed between forming gears to obtain a corrugated metal band in a wavy shape with longitudinal ridges spaced at pitches of 2.5 mm.

Then the sheet-like band and the corrugated band were superposed one over the other to define areas of contact therebetween, whereupon these two bands were rolled together into a spiral form and were spot-welded at desired locations to prevent them from loosening. As a result, a honeycomb core structure having an outer diameter of 70 mm and defining many network-patterned gas flow passages along a central axis thereof was formed.

(ii) Production of metal casing

Fine recesses having a width of 0.03 mm and a depth of 0.02 mm were formed on a sheet of austenitic stainless steel (SUS 304) by rolling the sheet by means of rolls. A tubular metal casing having an inside diameter of 70 mm, a thickness of 1.2 mm and a length of 80 mm was produced from the resulting steel sheet, with the fine recesses located on the inner wall of the casing as shown in FIG. 3.

(iii) Production of metal-made carrier body

The fine recesses formed on the inner wall of the metal casing were filled with a paste of brazing material (nickle). Then the honeycomb core structure was forcedly enclosed in the metal casing, whereupon the metal casing and the honeycomb core structure were brazed together by heating them in vacuum at a temperature of at least the melting point of the brazing material. As a result, a metal-made carrier body with the metal casing and the honeycomb core structure free from separation for a long period of time was obtained.

EXAMPLE 2

(i) Production of honeycomb core structure

A heat-resistant thin steel band made of ferritic stainless steel (Cr content: 20%, Al content: 5%) and having a thickness of 0.04 mm and a width of 74.5 mm were used as a sheet-like metal band.

The sheet-like metal band was fed between forming gears to obtain a corrugated metal band in a wavy shape with longitudinal ridges spaced at pitches of 2.5 mm.

Then the sheet-like metal band and the corrugated metal band are superposed one over the other to define areas of contact therebetween, whereupon these two bands were rolled together into a spiral form and spot-welded at desired locations to prevent them from loosening. As a result, a honeycomb core structure having an outer diameter of 70 mm and defining many network-patterned gas flow passages along a central axis thereof was formed.

(ii) Production of metal casing

Fine recesses having a width of 0.03 mm and a depth of 0.02 mm were formed on a sheet of austenitic stainless steel (SUS 304) by grinding. A tubular metal casing having an inside diameter of 70 mm, a thickness of 1.2 mm and a length of 80 mm was produced from the resulting steel sheet, with the fine recesses located on the inner wall of the casing as shown in FIG. 11.

(iii) Production of metal-made carrier body

The fine recesses formed on the inner wall of the metal casing were filled with a brazing material (nickle) in the form of wire rods. Then the honeycomb core structure was forcedly enclosed in the metal casing, whereupon the metal casing and the honeycomb core structure were brazed together by heating them in vacuum at a temperature of at least the melting point of the brazing material. As a result, a metal-made carrier body with the metal casing and the honeycomb core structure free from separation for a long period of time was obtained.

What is claimed is:

1. A metal-made carrier body for carrying thereon an exhaust gas cleaning catalyst, said carrier body being formed by superposing a sheet metal band made of a thin metal sheet and a corrugated band made from another thin metal sheet one over the other in a contiguous relation into a honeycomb core structure of a spiral or laminate form defining many network-patterned gas flow passages along the central axis thereof, and then fixing the honeycomb core structure within a tubular metal casing, characterized in that the tubular metal casing defines, in an inner wall thereof, fine recesses for promoting the penetration of a molten brazing material.

2. A metal-made carrier body according to claim 1, wherein the fine recesses are formed on the entire inner wall of the tubular metal casing.

3. A metal-made carrier body according to claim 1, wherein the fine recesses formed on the inner wall of the tubular metal casing are disposed only at a central portion of the inner wall.

4. A metal-made carrier body according to claim 1, wherein the fine recesses are formed on the inner wall of the tubular metal casing in straight or curved lines extending at a desired angle with respect to the central axis of the tubular metal casing.

5. A metal-made carrier body according to claim 4, wherein the fine recesses are formed on the inner wall of the tubular metal casing in straight or curved lines parallel to the central axis of the tubular metal casing and spaced at desired intervals.

6. A metal-made carrier body according to claim 4, wherein the fine recesses are formed on the inner wall of the tubular metal casing in intersecting straight or curved lines extending at a desired angle with respect to the central axis of the tubular metal casing and spaced at desired intervals.

7. A metal-made carrier body according to claim 4, wherein the fine recesses are formed on the inner wall of the tubular metal casing in straight or curved lines perpendicular to the central axis of the tubular metal casing and spaced at desired intervals.

8. A metal-made carrier body according to claim 4, wherein the fine recesses are formed on the inner wall of the tubular metal casing in straight or curved lines extending at a desired angle with respect to the tubular metal casing and spaced at irregular intervals.

9. A metal-made carrier body according to claim 1, wherein the fine recesses are formed on the inner wall of the tubular metal casing in dots.

10. A metal-made carrier body according to claim 1, wherein said fine recesses have from 0.03 to 0.3 mm and depths from 0.03 to 0.3 mm.

11. A method of manufacturing a metal-made carrier body for carrying thereon an exhaust gas cleaning catalyst, including superposing a sheet metal band made of a thin metal sheet and a corrugated band made from another thin metal sheet one over the other in a contiguous relation into a honeycomb core structure of a spiral or laminate form defining many network-patterned gas flow passages along the central axis thereof, and then inserting the honeycomb core structure within a tubular metal casing and fixing the former on the latter, characterized in that:

(i) a tubular metal casing defining, in an inner wall thereof, fine recesses for promoting the penetration of a molten brazing material is used as the tubular metal casing, and the honeycomb core structure is forcedly inserted into the metal casing with or without a brazing material filled in the fine recesses; and (ii) the metal casing with the honeycomb core structure inserted therein is thereafter subjected to a heat treatment at a temperature of at least the melting point of the brazing material without applying the brazing material or after applying the brazing material to marginal portions opposite open ends of the tubular metal casing.

12. A method according to claim 11, wherein the fine recesses are formed on the entire inner wall of the tubular metal casing.

13. A method according to claim 11, wherein the fine recesses are formed on the inner wall of the tubular metal casing only at a central portion of the inner wall.

14. A method according to claim 11, wherein the fine recesses are formed on the inner wall of the tubular metal casing in straight or curved lines extending at a desired angle with respect to the central axis of the tubular metal casing.

15. A method according to claim 11, wherein the fine recesses are formed on the inner wall of the tubular metal casing in dots.

16. A metal-made carrier body according to claim 11, wherein said fine recesses have widths from 0.03 to 0.3 mm and depths from 0.03 to 0.3 mm.

* * * * *

UNITED STATES PATENT AND TRADEMARK OFFICE
CERTIFICATE OF CORRECTION

PATENT NO. : 5,026,611
DATED : June 25, 1991
INVENTOR(S) : Masayoshi USUI and Haruo SERIZAWA It is certified that error appears in the above-identified patent and that said Letters Patent is hereby corrected as shown below:

ON THE TITLE PAGE:

Item [73]: The Assignee should read as follows:

-- Usui Kokusai Sangyo Kabushiki Kaisha, Japan --

Signed and Sealed this

Sixth Day of April, 1993

Attest:

STEPHEN G. KUNIN

Attesting Officer

Acting Commissioner of Patents and Trademarks